United States Patent [19]
Glaser

[11] 4,076,432
[45] Feb. 28, 1978

[54] CORNER CONSTRUCTION
[75] Inventor: Harold Glaser, St. Louis County, Mo.
[73] Assignee: James David Incorporated, Maryland Heights, Mo.
[21] Appl. No.: 718,776
[22] Filed: Aug. 30, 1976
[51] Int. Cl.² .............................................. F16B 7/00
[52] U.S. Cl. ................................... 403/176; 403/171; 403/295; 403/205
[58] Field of Search ............................... 403/169–178, 403/205, 217, 231, 295, 298, 405, 406, 401, 402, 359, 362

[56] References Cited
U.S. PATENT DOCUMENTS
3,089,716  5/1963  Berkowitz ............................. 403/15

FOREIGN PATENT DOCUMENTS
2,233,882  1/1975  France .................................. 403/171
1,266,283  3/1972  United Kingdom ................. 403/295

Primary Examiner—Wayne L. Shedd
Attorney, Agent, or Firm—Ralph W. Kalish

[57] ABSTRACT

A corner construction as used for furniture, display fixtures, and the like which comprises a corner connector of rigid, yet limitedly, compressible material of construction having a body with a plurality of arms; each arm extending from the body in axially perpendicular relationship to the adjacent arm. Each arm of said connector is of four sided tubular character with the sides recessed to develop co-extensive corner, ridge-forming elements each having a rounded outer edge. Each arm is lengthwise tapered from its body connected end to its outer free end in the order of approximately one degree. Tubular frame members of four sided cross-section being open at their ends receive the arms of said corner connector as by a snug, friction fit for integration into the intended article. The corner connector arms are so related to the body thereof that when in a horizontal disposition the corner ridge elements will be in diamond-forming relation as viewed in a vertical plane and thereby causing the engaged frame members to present one side thereof for supporting panels, shelves, table tops, and the like.

3 Claims, 4 Drawing Figures

CORNER CONSTRUCTION

BACKGROUND AND SUMMARY OF THE INVENTION

This invention relates in general to join structures and, more particularly, to a corner construction.

Heretofore, various efforts have been undertaken to integrate discrete frame components, as customarily of tubular stock, into a rigid framework for use in the construction of various of furniture, merchandise display fixtures, storage equipment, and the like which are primarily designed for submission to the ultimate user in a knock-down or disassembled state for assembly by the user pursuant to accompanying instructions. Such efforts have understandably incorporated expedients for coupling or joining the components by means of corner-forming elements. However, such elements have in many instances required the utilization of extrinsic securing means, such as screws, bolts, and like fasteners; as ell as even brazing and welding, so that relative difficulty has occasioned the user to assure the assembled entity will resist breakdown under normal usage. Other expedients seeking a novel interengagement between the corner forming elements and the components have not proved fully reliable in use.

The present invention resides in a corner construction whereby discrete tubular frame members are integrated into furniture, display fixture, and like units or modules without the necessity of resort to independent securing means and comprises a corner connector having a body with a plurality of arms extending therefrom with adjacent arms being in perpendicular relationship. Such connector may usually contain three such arms which are in mutually axially normal relationship but, if desired, may incorporate six arms so that the article to be formed may "grow" in various directions. Each arm is of generally four-sided tubular character, having ridge-forming or sturdy, fin-like elements coextensive with the corner portions of the included sides and with each arm being slightly tapered inwardly from its body adjacent end to its opposite or free end as in the order of approximately 1°. Thus, the limited wedge-like contour of the arm facilitates insertion within the end of the adjacent frame member which is of like cross-sectional character and thereby promotes the requisite union, the same being effected through a snug, frictional fit and with the dimensions of the cross-sectional area defined by said ridge-forming elements at their base ends being substantially the same as those of the interior or bore of the engaged frame member.

Therefore, it is an object of the present invention to provide a corner construction especially usable for utilization in furniture, display fixtures, storage equipment and the like to integrate the frame components thereof in a highly stable fashion, presenting a sturdy, resultant structure.

It is another object of the present invention to provide a corner construction of the character stated which conduces to ease of assembly into a reliable joint formation, being resistant to inadvertent or accidental disassembly, but yet which joint may be intentionally disassembled in a rapid manner.

It is a further object of the present invention to provide a corner construction of the character statd which is adapted to unite structural components of the particular article in such manner as to allow the article to "grow" in desired directions from a basic module.

It is another object of the present invention to provide a corner construction of the character stated which allows for securement of the structural components of the particular article within the framework thereof without requiring the services of skilled personnel, and which obviates the necessity of resort to complex tools for assembly, as well as the necessity of extrinsic fasteners and the like.

It is a still further object of the present invention to provide a corner construction of the character stated which comprehends components, and particularly a corner connector, which are most economical in production thereby being amenable to low cost, high volume production; which construction is of marked versatility in use; and which is extremely durable and reliable in usage.

It is a still further object of the present invention to provide a corner connector for use in a corner construction of the character stated which is so related to the engaged frame members as to conduce to a novel support thereby for planer components of the particular articles, such as panels, shelves, table tops, and the like.

It is a further object of the present invention to provide a corner connector of the character stated which is so uniquely designed as to engage the associated frame members in a reliable manner so as to inhibit separation or structural weakening when encountering the stresses of usage.

DESCRIPTION OF THE PREFERRED EMBODIMENT

Figure 4:
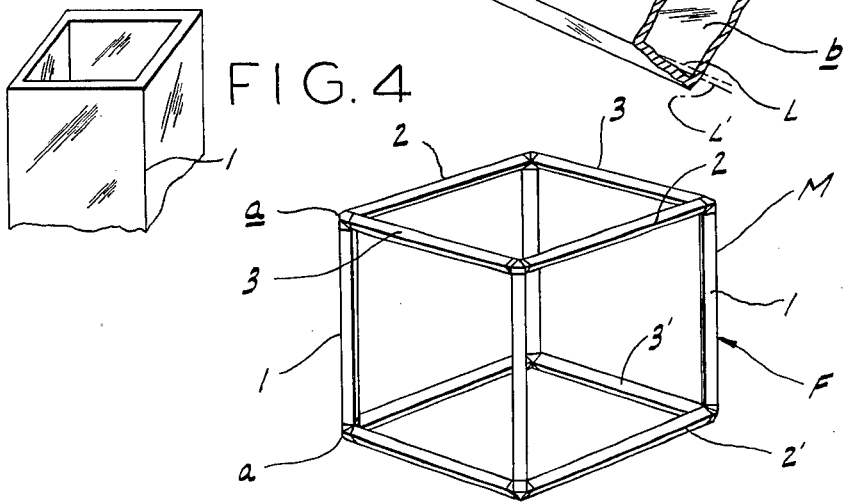
FIG. 4 is a perspective view of a furniture module incorporating the corner construction of the present invention.

Referring now by reference characters to the drawings which illustrate the preferred embodiment of the present invention, M designates a generally cubic-shaped furniture module (see FIG. 4) which is set forth for exemplary purposes only, being but one of myriad structures with which the present invention may be utilized. Module M includes a frame F comprehending a vertical leg 1 at each corner of said module M, horizontally presented parallel upper and lower end bars or rails 2,2', respectively, horizontally presented parallel upper and lower side bars or rails 3,3'; which components are integrated by upper and lower corner connectors *a,a'* as will be more fully discussed hereinbelow. It is to be noted that connectors *a,a'* are of identical construction, but simply reversed in view of their relative position, so that description of connector *a* is equally applicable to connector *a'*. Corner connector *a* comprises a solid body 4 of, preferably, multi-faceted design, and embodying a plurality of arms projecting from body 4 in axially perpendicular relationship to at least the immediately adjacent arm. Thus, for purposes of description, connector *a* is shown as incorporating three arms 5, 6, 7 for interengagement with an end bar 2, a side bar 3, and a leg 1 for developing the corners or joints of module M. Although only three such legs have been shown, it is to be understood that if desired a total of six legs could project from each connector *a* so as to engage as many frame components whereby the article of construction is enabled to "grow" in various desired directions thereby permitting the augmentation of the number of modules M.

Each of said arms 5, 6, 7 is of broadly four sides character, preferably square, with each side, as indicated at 8, being recessed, as at *r*, throughout substantially the length of each such side so that the corner portions, as at *s*, between adjacent sides are accentuated to present ridge-forming, or fin-like elements 9, 10, 11, 12 which are coextensive with the related arm and with the outer edges thereof being formed on a slight radius as suggested at 13. Connector body 4, at the inner end of each arm 5, 6, 7, contains a planar surface 14 which is perpendicular to the longitudinal axis of the related arm, and possesses dimensions which are slightly greater than the corresponding maximum dimensions of the cross-section of the adjacent arm for constituting an abutment 15 for the end of the particular frame component 1, 2, or 3, as the case may be, engaged on the adjacent arm. As may best be seen in FIGS. 1 and 2, each arm 5, 6, 7 is lengthwise inwardly tapered frm its abutment surface adjacent end to its outer free end, as in the order of approximately 1°, whereby each arm 5, 6, 7 is endowed with a limited, yet scarcely perceptible, wedge contour. Each arm 5, 6, 7 is also of general tubular configuration having a square bore 16 opening through the outer free end and terminating at base 15. Corner connector *a* is fabricated of lightweight, durable, strong material of construction which contains a slight degree of compressibility and thus is particularly amenable to development from suitable plastic.

Figure 1:
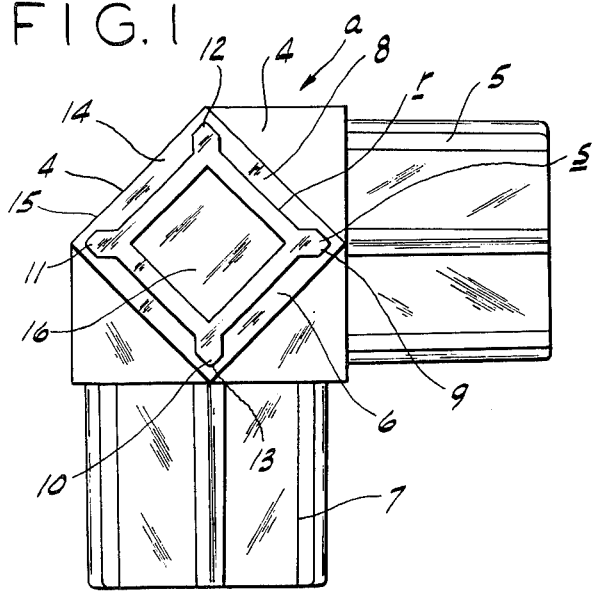
FIG. 1 is an end view of a corner connector constructed in accordance with and embodying the present invention.
Figure 2:
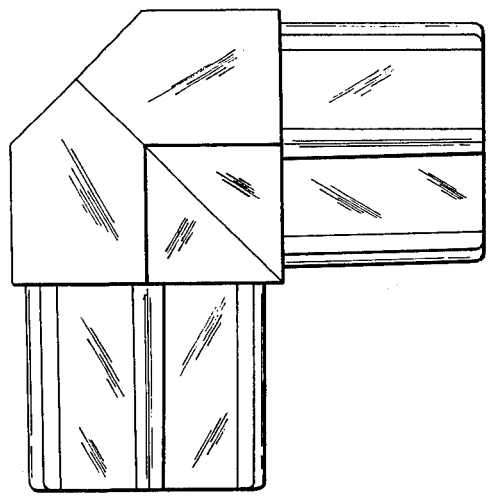
FIG. 2 is a side view of the corner connector.
Figure 3:
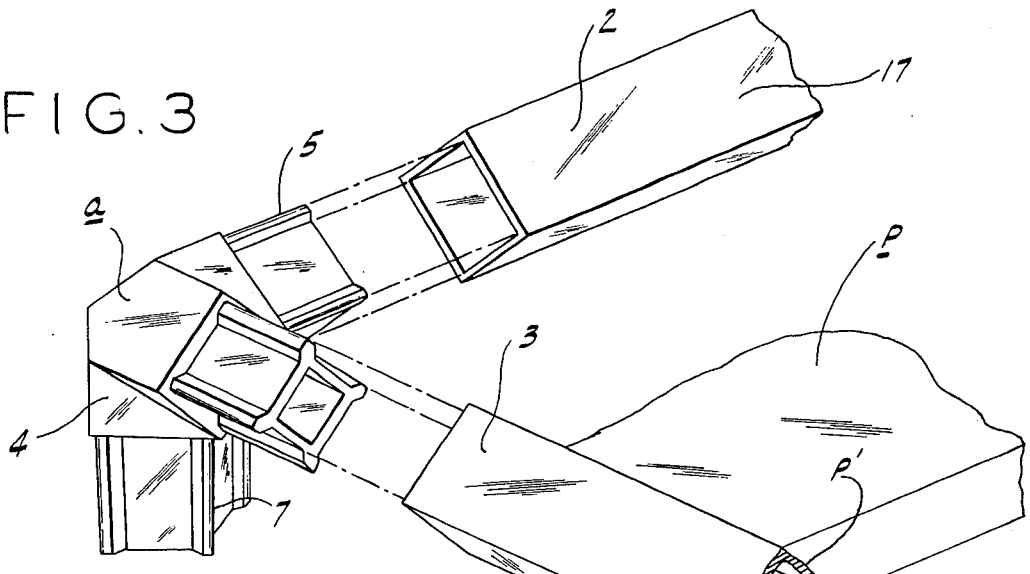
FIG. 3 is an exploded, perspective view of the corner construction of the present invention.

With reference now being made to FIGS. 1 and 3, it will be observed that connector body 4 is so designed that the arms thereof, which will be presented horizontally when in joint formation, such as arms 5 and 6, when viewed in a vertical plane, the ridge-forming elements thereof will be in what might be considered a diamond mode in that said elements 10,12 are vertically aligned, while elements 9,11 are horizontally aligned along an axis 90° to that extending between the other two elements. The importance of this disposition will be more evident from the description hereinbelow.

Each frame member, such as leg 1, end rail 2, and side rail 3 are of tubular formation, being open at their opposite ends and of quadrilateral, but preferably square cross-section. The outside dimensions of said leg 1 and rails 2,3 throughout the major extent thereof are substantially the same as that of connector body abutment 15. However, the same at opposite ends thereof are sized, and outwardly tapered or flared at an angle of approximately one degree (1°). The dimensions of the bores, as at *b*, of said members 1, 2, 3 throughout the major extent thereof are substantially the same as the maximum dimensions of arms 5, 6, 7 at their connector body adjacent ends; that is, except for the limited end flaring as above described. When module M is in assembled condition, the end surfaces of said frame and rail members 1, 2, 3 snugly abut against the adjacent connector body abutment 15.

Thus, to develop a joint for forming the corner construction of the present invention, each frame member 1, 2, 3 is in turn respectively addressed to arms 7, 6, 5, as the case may be, for reception of the outer end of the latter; by reason of the limited opposite tapers thereof union is facilitated. It will be seen that each arm 5, 6, 7, is of less dimensions in its outer end than the related dimensions of the bore *b* of the associated frame member. Arms 5, 6, 7, move relatively within the associated frame or rail member and progressively develop a more snug fit which is fully established when the inner end of the related frame and rail members 1, 2, 3 as the case may be, abuts against the confronting surface 15 of connector body 4, whereby further movement is manifestly restrained. The tight wedging of arms 5, 6, 7 within the related frame member is promoted by the tubular nature of such arm which coordinates with the inherent limited compressibility of the material of construction of such arm to "give" as the union is brought about with the particular frame member. The inherent outward urging of the sides of each arm assure that a stable joint is created. Thus, the connector *a* of the present invention, together with the engaged leg 1 and end and side rails 2,3 is effected without resort to the use of screws, bolts, or other extrinsic fasteners, without any necessity of considering brazing, welding, or the like. The sturdiness of the corner construction is further enhanced by the fact that the rounded character of the edges of ridge-forming elements 9, 10, 11, 12 of each arm 5, 6, 7 will abut against the inner faces of adjacent sides of the engaged frame member 1, 2, 3, as the case may be, on opposite sides of the intervening sharp corner so as to thereby create spaced lines of contact as suggested at 1,1' in FIG. 3. Such contactive relationship further enhances the snugness of the inter-fit of such arms with the respective frame members and thereby reduce the potential for accidental disassembly, or even relative shiftability.

By reason of presentation of arms 5, 6, 7 in what has been referred to as the diamond mode, it will be seen that the correspondingly presented horizontal members, such as end and side rails 2,3, must also necessarily be disposed in a like mode so that the cross-section thereof when viewed vertically will describe a diamond configuration. By such arrangement the upper inner side, as at 17, of each of said end and side rails 3 will be presented at an angle of approximately 45° to the vertical and thereby present a support surface for the end edges of a planar member, such as a shelf, panel, table top, or the like indicated *p* to be incorporated in the particular article developed. It will be observed that such component *p* may incorporate a champfered edge, as at *p'*, which is complementary to frame component side 17. By reason of this relationship the component *p* is snugly held aganist the engaged rail.

Accordingly the unique presentation of arms 5, 6, 7 conduces to the incorporation of load-supporting surfaces within module M without requiring various types of mounting expedients, such as brackets, and the like, as have heretofore been required for retaining such horizontal members firmly in operative position.

Having described my invention, what I claim and desire to obtain by Letters Patent is:

1. A corner connector for developing a corner construction for furniture and the like comprising a body, a plurality of arms integral with said body and projecting therefrom in axially perpendicular relationship to the at least immediately proximate arm, each arm having a normally free end spacedly from said connector body, each arm tapering inwardly toward its free end so that the free end is of less cross-section than the opposite or body-adjacent end, each of said arms being of four-sided character and having projecting ridge-like elements at the intersection of adjacent sides, the axis of projection of said ridge-like elements being at an angle greater than 90° to the planes of the adjacent sides of the related arm, each of said ridge-like elements spacedly from the adjacent sides having an outer arcuate edge, said arms being presented with respect to said body whereby adjacent ridge-like elements are disposed within mutually perpendicular planes, and each arm being of tubular character having a substantially coextensive bore opening outwardly through the free end thereof.

2. A corner connector as defined in claim 1 and further characterized by the taper in each arm being approximately 1°.

3. A corner connector as defined in claim 2 and further characterized by said connector body and arms being unitarily fabricated from a rigid material having limited compressibility.

* * * * *